United States Patent [19]
Beard et al.

[11] Patent Number: 5,556,538
[45] Date of Patent: Sep. 17, 1996

[54] DENITRIFICATION SYSTEM

[76] Inventors: Gary J. Beard, 5131 Bull Run, Baton Rouge, La. 70817; Harold J. Beard, 1111 Colonial Dr., Baton Rouge, La. 70806

[21] Appl. No.: 343,715

[22] Filed: Nov. 22, 1994

[51] Int. Cl.$^6$ ........................................ C02F 3/30
[52] U.S. Cl. ........................ 210/194; 210/195.1; 210/255; 210/605; 210/926; 210/903
[58] Field of Search ........................ 210/605, 607, 210/621, 629, 630, 194, 195.1, 256, 259, 255, 903, 926

[56] References Cited

U.S. PATENT DOCUMENTS

| | | |
|---|---|---|
| 3,939,607 | 2/1976 | Huisman .................................. 210/629 |
| 4,159,243 | 6/1979 | Okey ........................................ 210/629 |
| 4,183,809 | 1/1980 | Klapwijk et al. ........................ 210/607 |
| 4,290,884 | 9/1981 | Mandt ...................................... 210/903 |
| 4,487,692 | 12/1984 | Kersten .................................... 210/926 |
| 4,936,982 | 6/1990 | DiGregorio et al. .................... 210/926 |
| 4,975,197 | 12/1990 | Wittmann et al. ....................... 210/629 |
| 5,192,442 | 3/1993 | Viccirillo et al. ....................... 210/605 |
| 5,290,451 | 3/1994 | Koster et al. ............................ 210/903 |

*Primary Examiner*—Christopher Upton
*Attorney, Agent, or Firm*—Roy, Kiesel & Tucker

[57] ABSTRACT

A denitrification apparatus, for use in a wastewater treatment system having a mixed liquor source, is disclosed. The apparatus has at least two non-aerated continuous channels, connected in series. Wastewater flows from the mixed liquor source into the series of channels and then flows back into the mixed liquor source. In a preferred embodiment the inlets and outlets for each channel are arranged so that the flow into the channel is into the lower portion of the channel, and the flow from the channel is from the upper portion.

6 Claims, 6 Drawing Sheets

DENITRIFICATION SYSTEM

BACKGROUND OF THE INVENTION

1. Field of the Invention

This invention relates, generally, to wastewater treatment systems; and particularly, to treatment systems which denitrify the wastewater.

2. Prior Art

Requirements imposed by numerous governmental agencies have generated several advances in wastewater treatment. Wastewater treatment facilities for the treatment of municipal or industrial waste are also under increasing budgetary pressures to employ systems which have lower capital, operating, and maintenance costs. Therefore, it is desirable to have a wastewater treatment system which minimizes costs while meeting the ever more stringent discharge quality requirements.

The treated discharge from wastewater treatment facilities must meet requirements for BOD (biological oxygen demand material), and in some cases must also meet requirements for maximum amounts of compounds containing nitrogen and phosphorus. The treatment process in which nitrogen is removed from wastewater is known as denitrification. While aerated zones are well-suited for reducing BOD by the use of aerobic organisms, such zones are not well-suited for denitrification. Non-aerated zones, which have a low content of dissolved oxygen (DO), are better suited for denitrification. Such non-aerated, low DO zones are also known in the art as anoxic zones.

In denitrification, activated sludge, also known as mixed liquor, is flowed into an anoxic zone. The mixed liquor contains aerobic organisms which have been growing because they have had fuel (BOD) and oxygen (found as DO in the mixed liquor). The aerobic organisms, upon entering the anoxic zone, find fuel (BOD) but find little or no oxygen. The aerobic organisms look to the nitrogen compounds as a source of oxygen. When the aerobic organisms break down the nitrogen compounds to obtain oxygen, nitrogen gas and other harmless bi-products are produced.

Different techniques have been used to create anoxic zones. In some systems, an anoxic zone is created in the oxidation ditch, usually just before the mixed liquor is aerated. Such systems are described in U.S. Pat. No. 4,290,884 to Mandt, and U.S. Pat. No. 5,275,722 to Beard. In other systems, such as that described in U.S. Pat. No. 3,764,523 to Stankewich, Jr., aerated treatment vessels are alternated with non-aerated anoxic treatment vessels.

There are at least two difficulties encountered in anoxic zone denitrification. First, it can be difficult to maintain the proper ratio among the three ingredients necessary to sustain the process: aerobic microorganisms (from the mixed liquor), nitrogen compounds (used for the oxygen they contain), and BOD (the fuel for the aerobic microorganisms). Secondly, it is difficult to achieve plug flow. Perfect plug flow is achieved when every unit of wastewater is cycled through a vessel for the exact period of time.

Because of friction along the sides of a vessel and other factors, achieving perfect plug flow is impossible; but it is desirable to come as close as possible to achieving it. The farther a denitrification system is from achieving perfect plug flow, the greater the probability that some wastewater is leaving the anoxic zone without having been properly treated, and some wastewater is remaining in the anoxic zone beyond the length of time necessary for denitrification. Neither of these conditions is desired.

OBJECTS OF THE INVENTION

It is an object of the present invention to provide a denitrification system which is compatible with current wastewater treatment systems which have a source of mixed liquor.

Another object of the present invention is to provide a denitrification system which significantly reduces the nitrogen in the wastewater to within applicable regulatory requirements.

Another object of the present invention is to provide a denitrification system which nearly achieves plug flow.

Another object of the present invention is to provide a denitrification system in which the proper ratio of nitrogen compounds, aerobic microorganisms, and BOD may be maintained by the operator of the system.

Another object of the present invention is to provide a system for which the capital costs are minimized.

Another object of the present invention is to provide a system which minimizes the energy and mechanisms necessary for mixing the anoxic basins.

SUMMARY OF THE INVENTION

An apparatus is provided for denitrification of wastewater in wastewater treatment systems having a source of mixed liquor. In one embodiment the apparatus includes a final continuous channel and an initial continuous channel, both channels being non-aerated. Other interim continuous channels may also be used, and all of the channels are fluidly connected in a series. The wastewater flows from the mixed liquor source through the initial channel, any interim channels, and the final channel; and then flows back to the mixed liquor source. In another preferred embodiment, the flow of wastewater is directed into the lower portion of each channel, and out from the upper portion of each channel.

These and other objects, advantages, and features of this invention will be apparent from the following descriptions of the invention.

DETAILED DESCRIPTION OF THE PREFERRED EMBODIMENT

Figure 1:
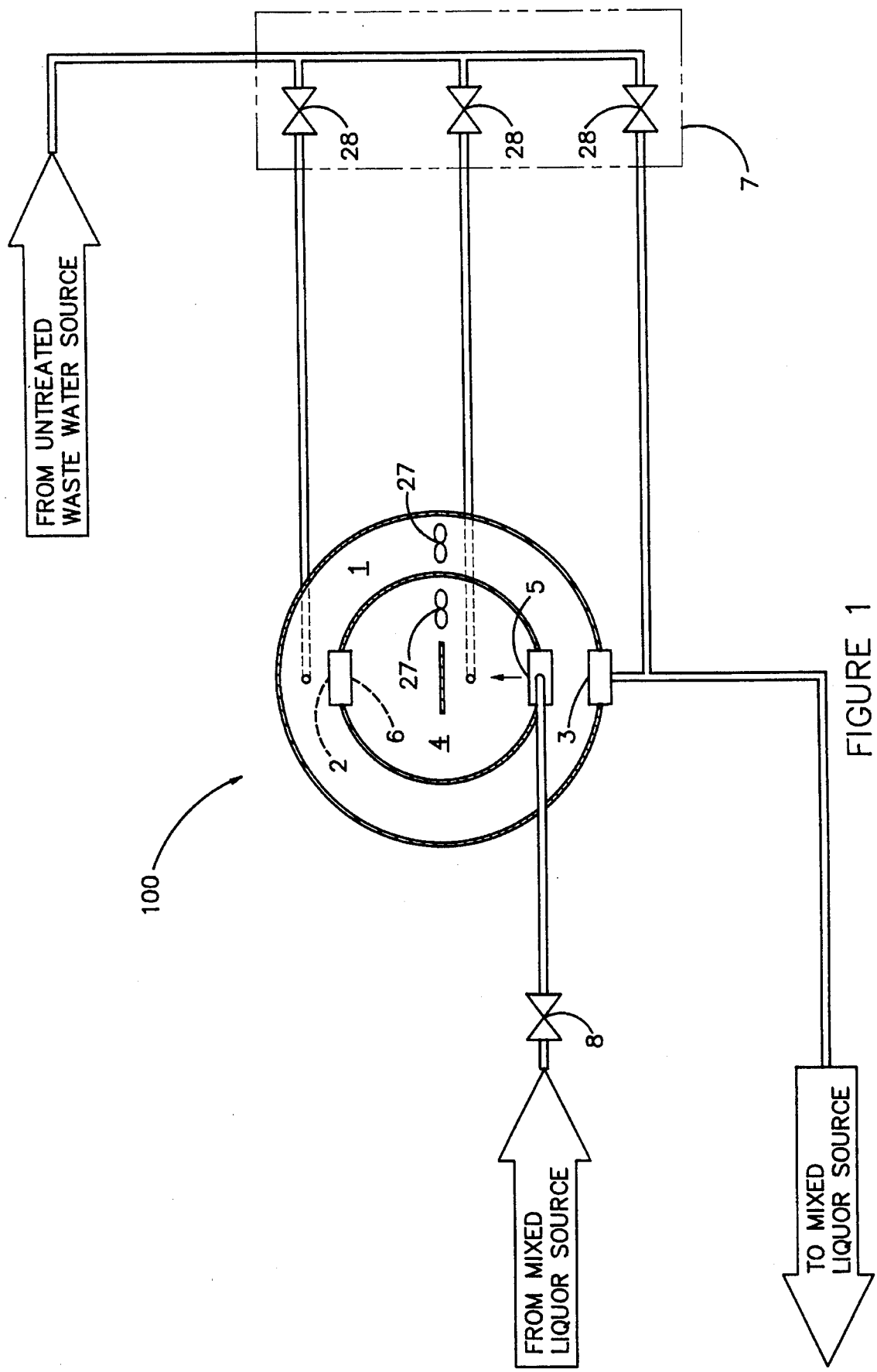
FIG. 1 is a plan view of the two-channel embodiment of the invention.

Referring to FIG. 1, a two-channel embodiment of denitrification apparatus 100 is shown. Denitrification apparatus 100 has two continuous channels fluidly connected in series; initial channel 4 and final channel 1. Each channel has an inlet for bringing wastewater into the channel and an outlet for flowing water out of the channel. Initial channel inlet 5 is fluidly connected to a mixed liquor source (not shown) by an inlet flow means. The mixed liquor source may be an aerated basin or any other type of source containing activated sludge.

Wastewater flows from the mixed liquor source into initial channel inlet 5 by the inlet flow means. The wastewater is circulated around initial channel 4 by circulating means 27. The wastewater flows out from initial channel 4 to final channel 1 via initial channel outlet 6 and final channel inlet 2. The wastewater is then circulated around final channel 1 by circulating means 27. The wastewater exits denitrification apparatus 100 via final channel outlet 3, and is returned to the mixed liquor source by an outlet flow means.

Because the channels are non-aerated, the aerobic organisms brought into denitrification apparatus 100 from the mixed liquor source will exhaust the DO in the wastewater, creating an anoxic environment. The aerobic organisms will then degrade the nitrogen compounds in order to obtain the oxygen they contain. Having been denitrified, the wastewater is returned to the mixed liquor source. In a preferred embodiment the wastewater may be flowed into denitrification apparatus 100 from a low DO point in the mixed liquor source, so as to accelerate the denitrification process.

Figure 8:
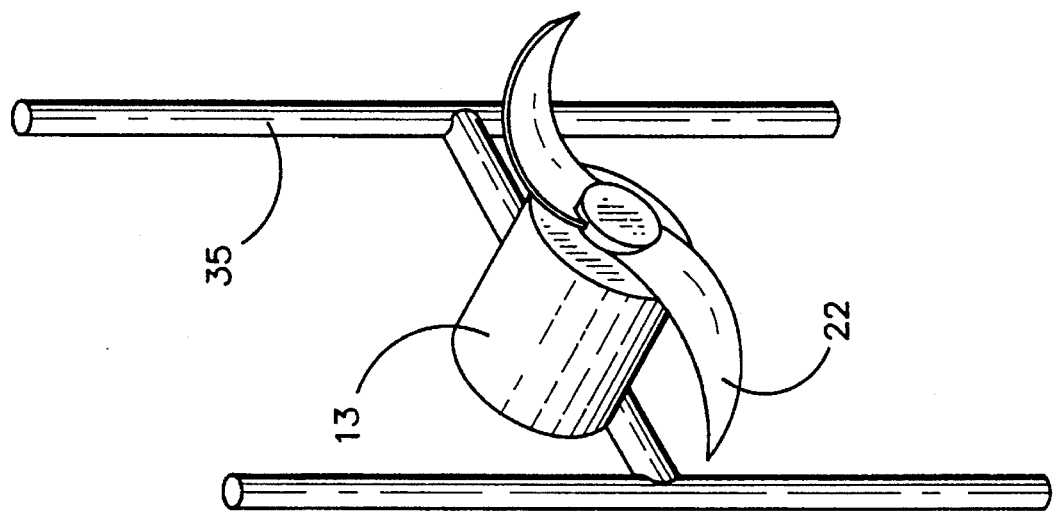
FIG. 8 is a perspective view of a preferred embodiment of a circulating means.

One or more circulating means 27 are placed deep enough into each channel so that circulating means 27 does not aerate the channel by mixing air into the wastewater. As depicted in FIG. 8, each circulating means 27 is a sealed submersible electric motor 13 which turns a propeller mixer 22. One or more circulating means 27 may be positioned in each channel using one or more mounting rods 35. Although a propeller device is depicted as circulating means 27, one skilled in the art could use a series of paddles which were conveyor or wheel mounted, for which only part of the travel path of the wheel was in the channel; or one could use any means suitable for causing wastewater to circulate in a continuous channel without aeration.

Figure 2:
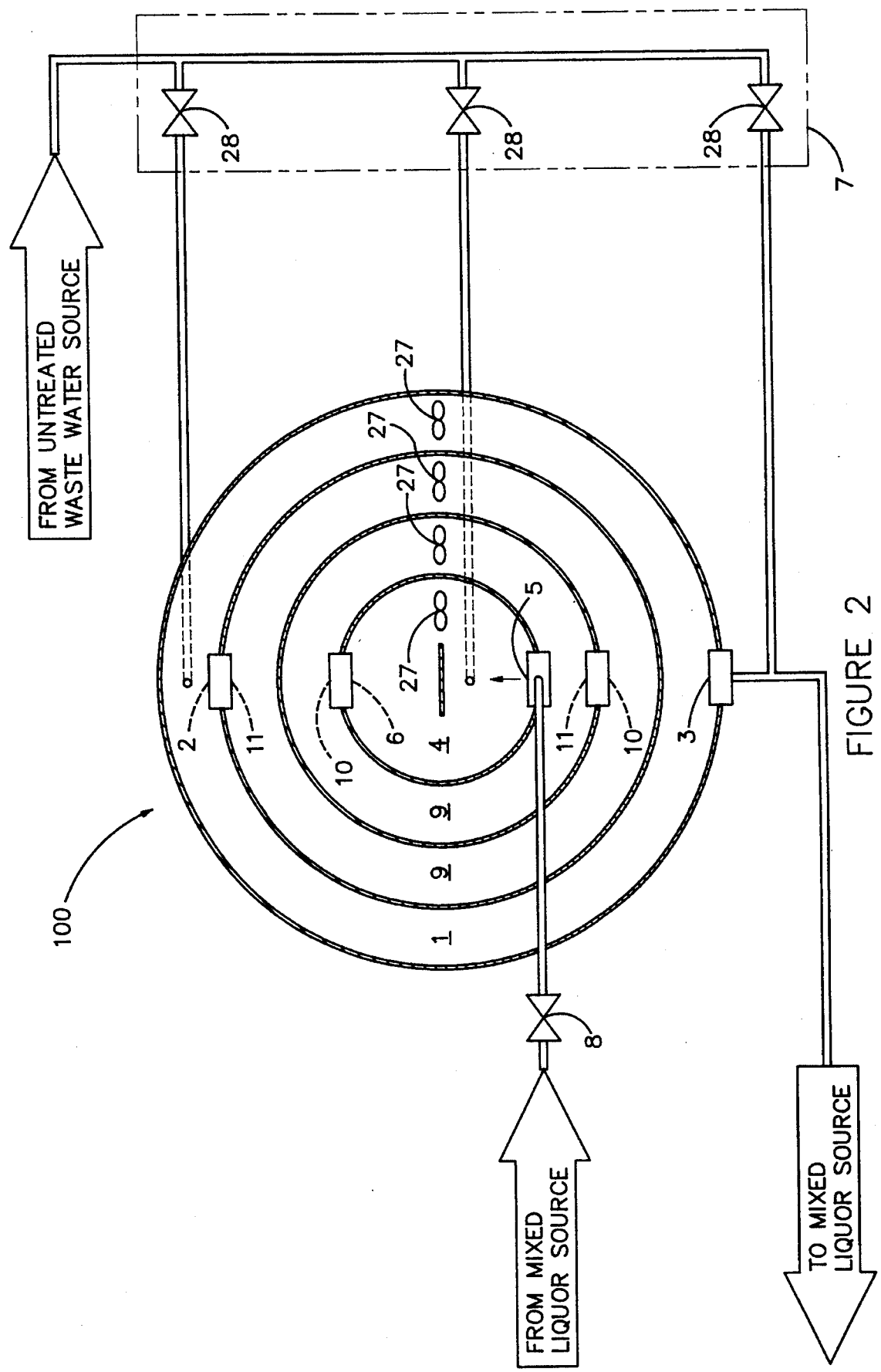
FIG. 2 is a plan view of a multi-channel embodiment of the invention.

Referring to FIG. 2, a multi-channel embodiment of denitrification apparatus 100 is shown. Similar to the embodiment in FIG. 1, the embodiment shown in FIG. 2 also has non-aerated continuous channels connected in series. Denitrification apparatus 100 depicted in FIG. 2 has initial channel 4, final channel 1, and one or more interim channels 9. Each channel has an inlet for bringing wastewater into the channel and an outlet for flowing wastewater out of the channel.

Initial channel inlet 5 is fluidly connected to a mixed liquor source by an inlet flow means, and wastewater flows from the mixed liquor source into initial channel inlet 5. The wastewater is circulated around initial channel 4 and flows out from initial channel 4 to an interim channel 9 via initial channel outlet 6 and interim channel inlet 10. The wastewater circulates around each interim channel 9 and leaves each interim channel 9 via interim channel outlet 11. Upon leaving the interim channel which is upstream from final channel 1, the wastewater flows into final channel 1 via final channel inlet 2. After circulating around final channel 1 the wastewater exits denitrification apparatus 100 via final channel outlet 3, and is returned to the mixed liquor source by an outlet flow means.

One or more circulating means 27 are in each channel, as in the two-channel embodiment, and circulate the wastewater around each channel. As with the two-channel configuration, in a particularly preferred embodiment, the mixed liquor can be flowed from a low DO point in the mixed liquor source.

As shown in FIGS. 1 and 2, denitrification apparatus 100 may include raw sewage manifold 7. Raw sewage manifold 7 is fluidly connected to a source of untreated wastewater (not shown). In the embodiments shown in FIGS. 1 and 2, raw sewage manifold 7 flows untreated wastewater into initial channel 4, final channel 1, and the mixed liquor source. In the embodiments shown, raw sewage manifold 7 includes raw sewage valves 28 so that the operator of denitrification apparatus 100 can selectively control the flow of untreated wastewater. However, one skilled in the art could eliminate raw sewage valves 28 so that the untreated wastewater flows freely into initial channel 4, final channel 1, and to the mixed liquor source. The untreated wastewater which is flowed into the anoxic environment of the channels will provide BOD to the aerobic organisms, this BOD being in addition to the BOD brought in with the wastewater from the mixed liquor source, thereby sustaining the denitrification process. In the particularly preferred embodiment depicted in FIGS. 1 and 2, the untreated wastewater will be brought into a channel by a raw sewage inlet near the bottom of the channel, and in close proximity to the channel inlet and mixed liquor inlet (which will be described later) for each channel.

Also shown in FIGS. 1 and 2 is mixed liquor valve 8, which may be used to selectively control the amount of wastewater flowed from the mixed liquor source into initial channel 4. However, one skilled in the art could practice the invention without mixed liquor valve 8 and simply allow wastewater to flow freely from the mixed liquor source into initial channel 4.

Figure 3:
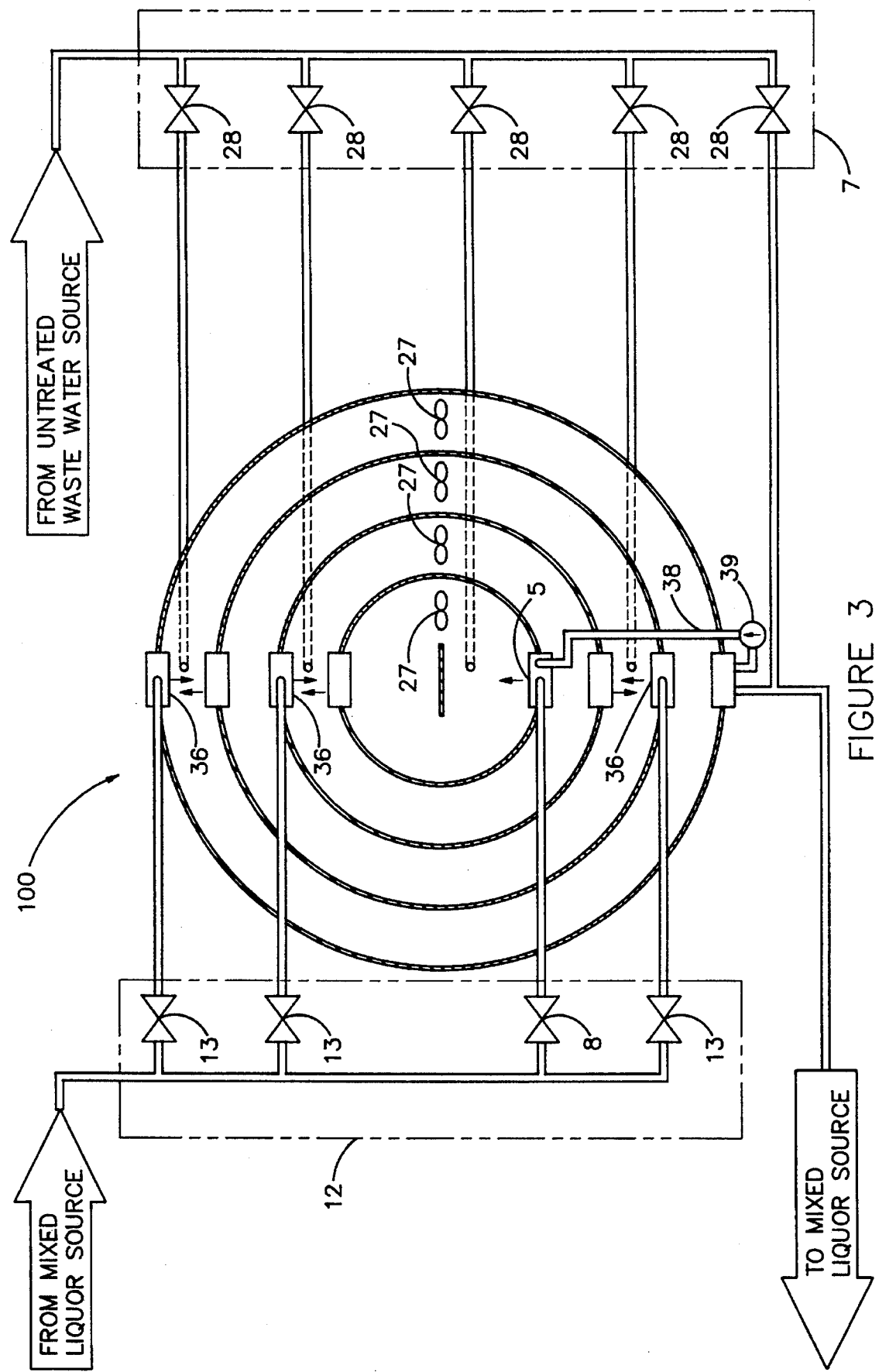
FIG. 3 is a plan view of a multi-channel embodiment of the invention, including a mixed liquor manifold.

FIG. 3 depicts an embodiment of denitrification apparatus 100 which includes mixed liquor manifold 12. Mixed liquor manifold 12 will include initial channel inlet valve 8 and mixed liquor valves 13. Mixed liquor valves 13 control the flow of wastewater from the mixed liquor source to the channels other than initial channel 4. Using mixed liquor manifold 12, the operator of denitrification apparatus 100 may selectively direct wastewater flowing from the mixed liquor source to each channel. Adjusting the amount of mixed liquor fed to each channel will allow more exact control over the environment in each channel, so as to better achieve the proper ratio of aerobic organisms, BOD, and nitrogen compounds. The mixed liquor will be received into initial channel 4 through initial channel inlet 5, and into the other channels through mixed liquor inlets 36. In a particularly preferred embodiment, initial channel inlet 5 and mixed liquor inlets 36 will direct the flow of mixed liquor into the lower portion of each channel.

Also depicted in FIG. 3 is another preferred embodiment of raw sewage manifold 7. In the embodiment depicted, raw sewage manifold 7 will include raw sewage valves 28 which control the flow of wastewater from the untreated wastewater source to all of the channels, not just initial channel 4 and final channel 1. Using raw sewage manifold 7, the operator of denitrification apparatus 100 may selectively direct wastewater flowing from the untreated wastewater source to each channel. Adjusting the amount of untreated wastewater fed to each channel will allow more exact control over the environment in each channel, so as to better achieve the proper ratio of aerobic organisms, BOD, and nitrogen compounds. In the particularly preferred embodiment of raw sewage manifold 7 depicted in FIG. 3, the untreated wastewater will be brought into a channel at the bottom of the channel, and in close proximity to the channel inlet and mixed liquor inlet 36 for each channel.

Figure 4:
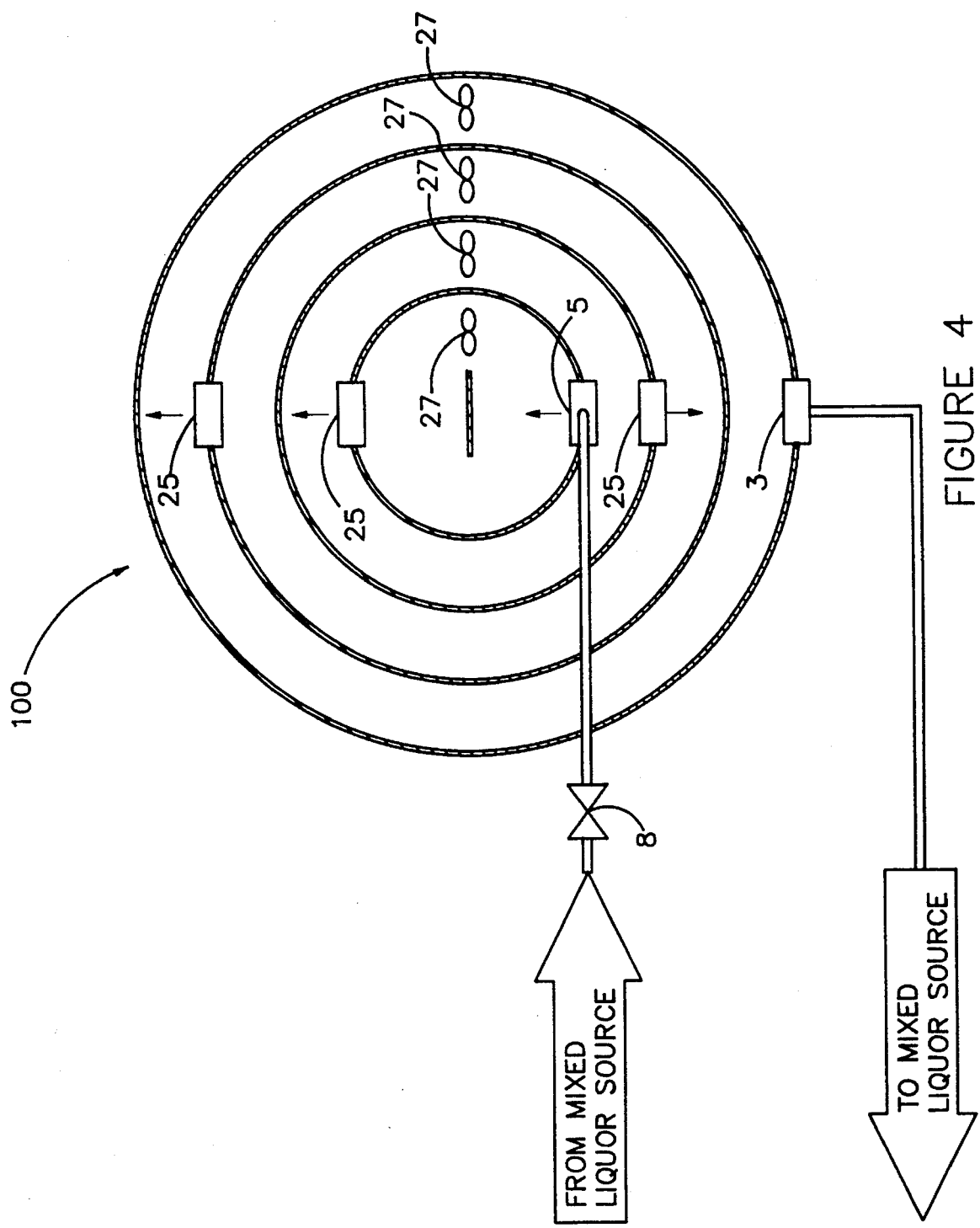
FIG. 4 is a plan view of an embodiment of the invention, including transfer boxes.

Denitrification apparatus 100 may also consist of one or more non-aerated continuous channels which flow aerated mixed liquor into the lower portion of each channel and out from the upper portion of each channel. This direction of the flow will help the system achieve more ideal plug flow. If there are two or more channels, the channels will be connected in series. In the embodiment depicted in FIG. 4, there are four continuous channels connected in series. The wastewater from the mixed liquor source is received into denitrification apparatus 100 at initial channel inlet 5, and the denitrified wastewater leaves denitrification apparatus 100 at final channel outlet 3. Each channel will have one or more circulating means 27 for circulating the wastewater around each channel.

Figure 5:
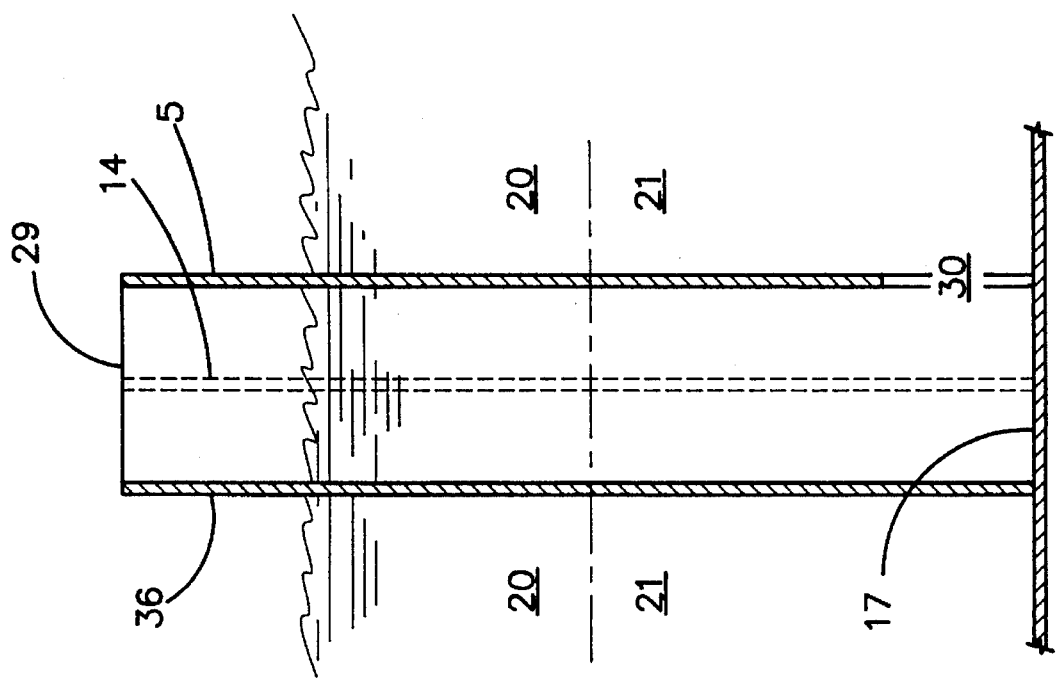
FIG. 5 is a sectional view of a preferred embodiment of a transfer box.

Transfer boxes 25 are provided for flowing the wastewater from channel to channel. A sectional view of a preferred embodiment of transfer box 25 is depicted in FIG. 5. Each channel has upper portion 20 and lower portion 21. Transfer box 25 is located in shared sidewall 14 of two immediately adjacent channels. Transfer box 25 has weir 15 and downstream opening 23, which is formed by transfer box bottom 17 and transfer box downstream wall 18. The wastewater in the upstream channel is contained by weir 15. When the height of the wastewater in the upstream channel reaches the top end 16 of weir 15 the wastewater from upper portion 20 flows over weir top end 16 into transfer box 25. The wastewater next flows out of transfer box 25 through downstream opening 23 into lower portion 21 of the downstream channel.

Figure 6:
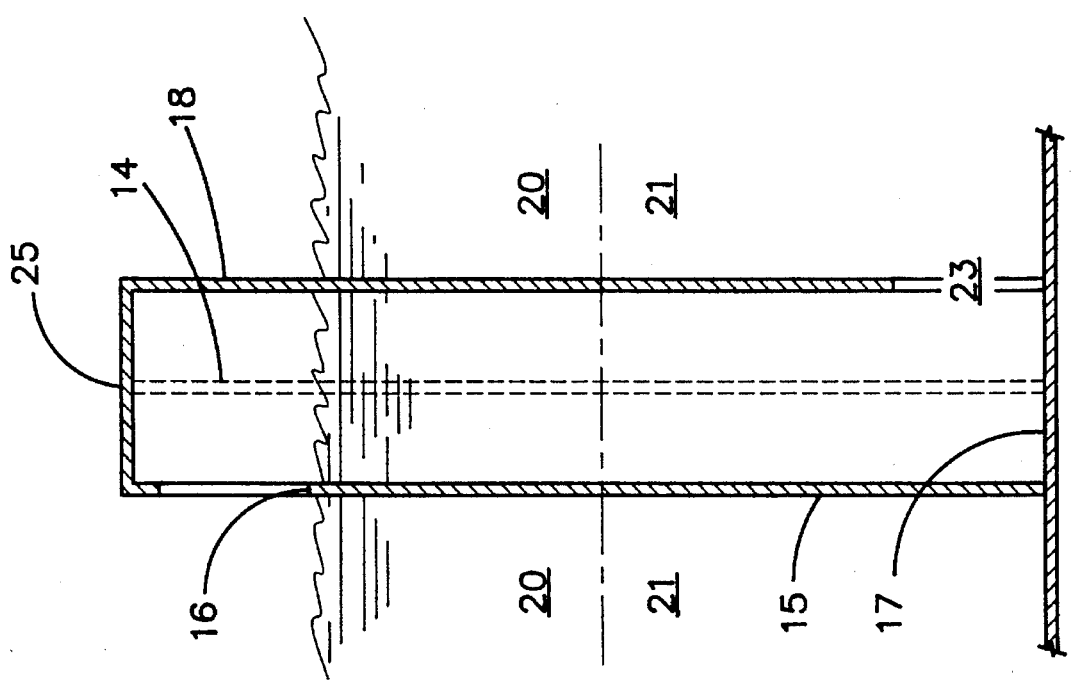
FIG. 6 is a sectional view of a preferred embodiment of an initial channel inlet.

A sectional view of a preferred embodiment of low inlet 37 is depicted in FIG. 6. Low inlet 37 may be used as the embodiment for initial channel inlet 5 and mixed liquor inlets 36. Using low inlet 37 the aerated mixed liquor will be flowed in through low inlet top opening 29 and out through low inlet bottom opening 30 into bottom portion 21 of a particular channel.

Figure 7:
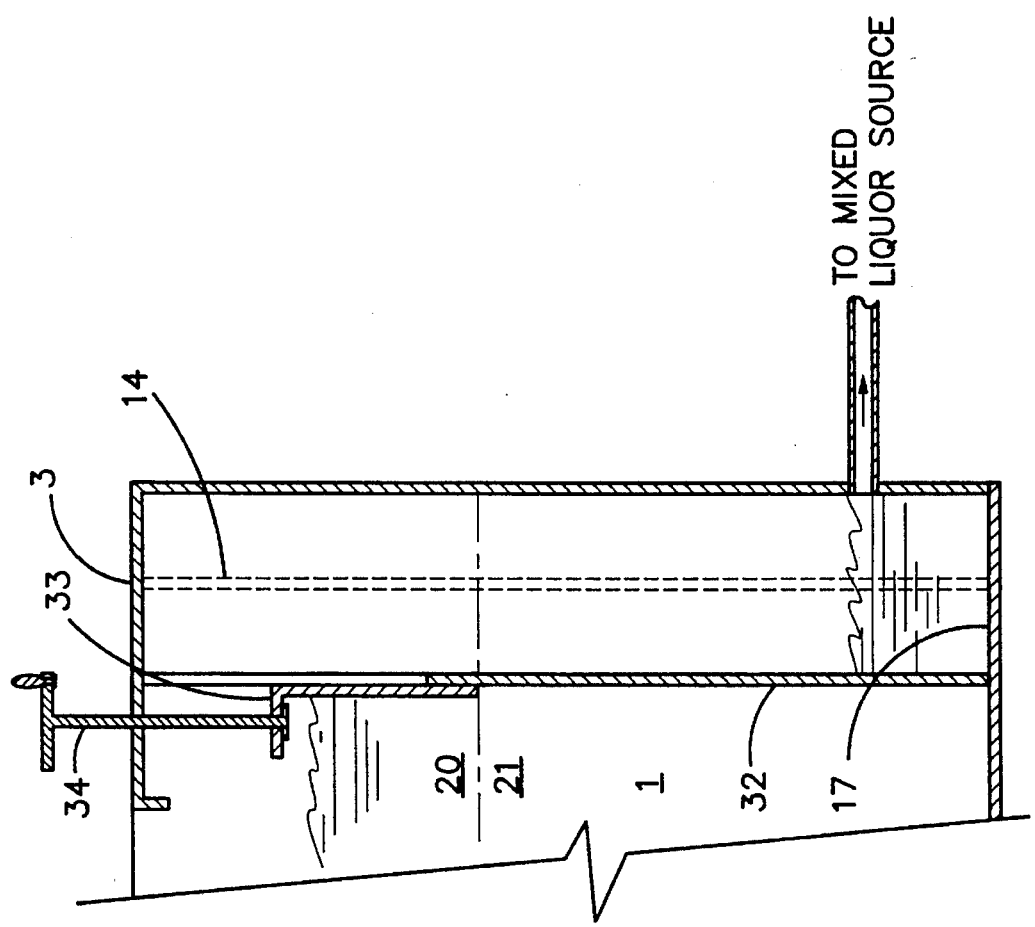
FIG. 7 is a sectional view of a preferred embodiment of a final channel outlet.

A sectional view of a preferred embodiment of final channel outlet 3 is shown in FIG. 7. Depicted is adjustable height weir 31 which has stationary section 32, movable section 33, and adjusting rod 34. A watertight seal is provided between stationary section 32 and movable section 33 so that movable section 33 can be vertically adjusted using adjusting rod 34, to increase or decrease the hydraulic retention of wastewater in final channel 1. By changing the hydraulic retention, the operator can control the treatment time in denitrification apparatus 100. The wastewater flows from upper portion 21 of final channel 1 over adjustable height weir 31 out to the aerated mixed liquor source.

The multi-channel embodiment of denitrification apparatus 100 may also include recirculating line 38 as depicted in FIG. 3. Because the level of wastewater at final channel outlet 3 is lower than at initial channel 1, recirculating pump 39 will be used to flow wastewater from final channel outlet 3 back to initial channel 1. Recirculating pump 39 is adapted so as to be adjustably controllable by the operator. Recirculating line 38 and recirculating pump 39 allow the operator to send some or all of the wastewater leaving denitrification apparatus 100 back into the initial channel for further treatment.

Transfer boxes 25 may be integrated into the embodiments of multi-channel denitrification apparatus 100 depicted in FIGS. 1, 2, and 3. As discussed earlier, in a particularly preferred embodiment, the mixed liquor will be flowed into each channel in close proximity to the inlet from the immediately adjacent channel, and the inlet from the raw sewage manifold. These inlets will be placed on the opposite side of the channel from the outlet. With this arrangement of inlets and outlets, a particle of wastewater will move in a spiraling path, from the bottom portion of the channel at one point, to the top portion at a point 180° degrees away from the inlet, nearly achieving ideal plug flow. This plug flow is accomplished while giving three necessary ingredients for denitrification (aerobic organisms, BOD, and nitrogen compounds) the maximum time to react.

There are of course other alternate embodiments which are obvious from the foregoing descriptions of the invention, which are intended to be included within the scope of the invention, as defined by the following claims.

I claim:

1. An apparatus for the denitrification of wastewater, for use in a wastewater treatment system having a mixed liquor source, comprising:

(1) two or more non-aerated continuous channels, said channels being fluidly connected in a series, each said channel comprising:
        (i) an upper portion;
        (ii) a lower portion;
        (iii) an inlet in said lower portion of said channel;
        (iv) an outlet in said upper portion of said channel;
        (v) a circulating means for circulating said wastewater in said channel;
        (vi) an inlet flow means for flowing said wastewater from said mixed liquor source to said inlet of an initial channel of said series; and
        (vii) an outlet flow means for flowing said wastewater from said outlet of a final channel of said series to said mixed liquor source;

(2) a selectively controllable raw sewage manifold fluidly connecting an untreated wastewater source to one or more of said channels and said mixed liquor source, said raw sewage manifold comprising one or more raw sewage inlets which are connected to said one or more channels;

(3) wherein said channels are concentrically arranged and each said channel further comprises vertical sidewalls, and wherein immediately adjacent upstream and downstream channels in said series share a sidewall, said upstream channel outlet and said downstream channel inlet together comprising a transfer box located in said shared sidewall, said transfer box comprising:
        (i) a weir having a top end, said top end of said weir extending into said upper portion of said upstream channel; and
        (ii) a transfer box bottom and a channel inlet wall having a downstream opening, said downstream opening being adjacent to said lower portion of said downstream channel.

2. The apparatus in claim 1, wherein successive transfer boxes are disposed in said sidewalls at approximately 180° from each other such that said inlet and said outlet for each said channel are at opposite ends of each said channel.

3. The apparatus in claim 2, wherein said channel inlet and said raw sewage inlet for each said channel are in close proximity to each other.

4. The apparatus in claim 3 further comprising a selectively controllable mixed liquor manifold fluidly connecting said mixed liquor source to each said channel; said mixed liquor manifold comprising one or more mixed liquor inlets connected to said one or more channels.

5. The apparatus in claim 4, wherein said channel inlet, said raw sewage inlet, and said mixed liquor inlet for each channel are all in close proximity to one another.

6. The apparatus in claim 5, further comprising a recirculating line and a recirculating means in fluid connection with said recirculating line for recirculating said wastewater from said final channel outlet to said initial channel.

\* \* \* \* \*